US009532206B2

(12) United States Patent
Bergstrom et al.

(10) Patent No.: US 9,532,206 B2
(45) Date of Patent: *Dec. 27, 2016

(54) DEVICES AND METHODS FOR INFORMATION ABOUT PLMN ID (71) Applicant: Telefonaktiebolaget L M Ericsson (publ), Stockholm (SE)

(72) Inventors: Andreas Bergstrom, Vikingstad (SE); Anders Molander, Linkoping (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/963,877

(22) Filed: Dec. 9, 2015

(65) Prior Publication Data

US 2016/0094978 A1 Mar. 31, 2016

Related U.S. Application Data (63) Continuation of application No. 14/715,824, filed on May 19, 2015, now Pat. No. 9,253,757, which is a
(Continued)

(51) Int. Cl.
*H04W 72/02* (2009.01)
*H04W 48/18* (2009.01)
(Continued)

(52) U.S. Cl.
CPC .............. *H04W 8/14* (2013.01); *H04W 48/18* (2013.01); *H04W 72/02* (2013.01); *H04W 8/26* (2013.01); *H04W 84/042* (2013.01)

(58) Field of Classification Search
CPC ........ H04W 72/02; H04W 48/18; H04W 8/26; H04W 84/042; H04W 8/14
See application file for complete search history.

(56) References Cited

U.S. PATENT DOCUMENTS 9,066,322 B2 * 6/2015 Bergstrom ............ H04W 48/18
9,253,757 B2 * 2/2016 Bergstrom ............ H04W 48/18
(Continued)

FOREIGN PATENT DOCUMENTS

EP          1991014 A1     11/2008

OTHER PUBLICATIONS

ETSI TS 123 251, Universal Mobile Telecommunications System (UMTS); LTE; Network sharing; Architecture and functional description (3GPP TS 23.251 version 10.2.0 Release 10), Jun. 2011, v10.2.0, pp. 1-29, Jun. 2011.
(Continued)

*Primary Examiner* — Omar Ghowrwal
(74) *Attorney, Agent, or Firm* — Baker Botts, LLP (57) ABSTRACT

A mobile station (110) for use in a Radio Access Network, RAN (102), connected to a core network (101) in which there is one or more Public Land Mobile Networks, PLMNs (103, 104, 105). The mobile station (110) is arranged to select one of said PLMNs (103, 104, 105), and is arranged to communicate with its RAN (102) by means of Radio Link Control, RLC, data blocks. The mobile station is arranged to include the identity, ID, of its selected PLMN in an RLC data block, and to inform the RAN (102) of the presence of the ID of the chosen PLMN in the RLC data block by means of including a reserved or pre-defined value in the length indication field of the RLC data block.

13 Claims, 5 Drawing Sheets

Related U.S. Application Data continuation of application No. 13/640,442, filed as application No. PCT/SE2012/051000 on Sep. 21, 2012, now Pat. No. 9,066,322.

(60) Provisional application No. 61/538,216, filed on Sep. 23, 2011.

(51) Int. Cl.
*H04W 8/14* (2009.01)
*H04W 8/26* (2009.01)
*H04W 84/04* (2009.01)

(56) References Cited

U.S. PATENT DOCUMENTS

| | | |
|---|---|---|
| 2006/0183502 A1 | 8/2006 | Jeong et al. |
| 2008/0098467 A1 | 4/2008 | Miller et al. |
| 2008/0253399 A1 | 10/2008 | Wang et al. |
| 2010/0167755 A1 | 7/2010 | Kim et al. |

OTHER PUBLICATIONS

Basic Concepts of WCDMA Radio Access Network, Ericsson, 2001, pp. 1-1O, 2001.

3GPP TS 44.060 V I 1.2.0 (Sep. 2012) 3rd Generation Partnership Project; Technical 2012 Specification Group GSM/EDGE Radio Access Network; General Packet Radio Service (GPRS); Mobile Station (MS)—Base Station System (BSS) interface; Radio Link Control I Medium Access Control (RLC/MAC) protocol (Release 11), Sep. 2012.

3GPP TS 44.060 V 1 0.5.0 (Jun. 2011) 3rd Generation Partnership Project; Technical 2011 Specification Group GSM/EDGE Radio Access Network; General Packet Radio Service(GPRS); Mobile Station (MS)—Base Station System (BSS) interface; Radio Link Control I Medium Access Control (RLC/MAC) protocol (Release 10), Jun. 2011.

3rd Generation Partnership Project; Technical Specification Group GSM/EDGE Radio Access Network; General Packet Radio Services (GPRS); Mobile Station (MS)—Base Station System (BSS) interface; Radio Link Control I Medium Access Control (RLC/MAC) protocol (Release 10), Jun. 2011.

3GPP TSG-GERAN Meeting #55; Vienna, Austria; Change Request (GP-121092), Aug. 27-31, 2012.

3GPP TSG-GERAN Meeting #53; Hamburg, Germany; Change Request (GP-120233), Feb. 27, 2012-Mar. 2, 2012.

3GPP TSG GERAN #53; Hamburg, Germany; PS solution for informing the BSS about selected PLMN ID; Agenda Item 7.2.5.3.1 (GP-120232), Feb. 27, 2012-Mar. 2, 2012.

EPO issued extended European search report for Application No./Patent No. 14179866.0-1857, Sep. 23, 2014.

Telefon AB LM Ericsson, ST-Ericsson SA, Alcatel-Lucent, "PS Solution for Informing the BSS About Selected PLMN ID," 3GPP TSG GERAN#53, GP-120232, Feb. 27-Mar. 2, 2012.

3GPP TS 44.060,"3ra Generation Partnership Project; Technical Specification Group GSM/EDGE Radio Access Network; General Packet Radio Service (GPRS); Mobile Station (MS)—Base Station System (BSS) Interface; Radio Link Control/Medium Access Control (RLC/MAC) Protocol (Release 10)," V10.5.0, Jun. 2011.

Written Opinion issued in International Application No. PCT/SE2012/051000, Jan. 25, 2013.

\* cited by examiner

DEVICES AND METHODS FOR INFORMATION ABOUT PLMN ID

PRIORITY

This application is a continuation, under 35 U.S.C. §120, of U.S. application Ser. No. 14/715,824 now U.S. Pat. No. 9,253,757 issued Feb. 2, 2016, which is a continuation, under 35 U.S.C. §120, of U.S. application Ser. No. 13/640,442 filed Oct. 10, 2012 now U.S. Pat. No. 9,066,322 issued Jun. 23, 2015, which is a U.S. National Stage Filing under 35 U.S.C. §371 of International Patent Application Serial No. PCT/SE2012/051000, filed Sep. 21, 2012 which claims the benefit, under 35 U.S. C. §119(a), of U.S. Provisional Application Ser. No. 61/538,216, filed Sep. 23, 2011, all of which are incorporated herein by reference.

TECHNICAL FIELD

The present invention discloses a device and a method for letting a mobile station send information about a chosen PLMN.

BACKGROUND

If a communications system includes a Core Network, CN, and a Radio Access Network, RAN, and both the CN and the RAN support so called multiple-operators core network, FULL-MOON, i.e. more than one PLMN in the CN, then, as part of the process of connecting a mobile station, MS, which also supports FULL-MOON to its preferred Public Land Mobile Network, PLMN, in the core network, the radio access network, RAN, which connects the mobile station to the core network, CN, needs to be aware of the ID of the preferred PLMN, which is at present a 4 octet long field.

At present, there is no mechanism for an MS to indicate its preferred PLMN ID to the RAN when accessing the PS domain, i.e. when connecting the MS to the CN, although this is needed in order to enable FULL-MOON in a communications system.

One method for solving this which has been suggested in 3GPP is to introduce a new Radio Link Control/Medium Access Control, RLC/MAC, message for sending a PLMN ID from the MS to the RAN.

This method might work, but would necessitate the introduction of a new message, and would also increase the load on the "air interface", i.e. the interface between the MS and the RAN.

Another proposed method is to include the PLMN ID in Non-Access Stratum, NAS, messages sent to the CN. Since NAS messages are tunneled via the RAN on their way to the CN and are thus transparent to the RAN, this implies two significant drawbacks with this approach:

1. Extra signaling procedures, new and/or a re-definition of existing messages between the CN and the RAN are needed.
2. The RAN needs to more or less randomly select one of the PLMNs to decode this NAS message. This PLMN could then very well "hijack" the mobile station by ignoring the PLMN ID that was included from the beginning, i.e. by the MS.

SUMMARY

It is an object of the invention to obviate at least some of the disadvantages mentioned above, and to provide a solution for how the ID of a mobile station's selected PLMN can be conveyed to a RAN to which the mobile station is connected.

This object is obtained by means of a mobile station for use in a Radio Access Network, a RAN, the RAN being connected to a core network in which there is one or more Public Land Mobile Networks, PLMNs.

The mobile station is arranged to choose one of said PLMNs when accessing a Packet Switched, PS, domain in the RAN, and the mobile station, is also arranged to communicate with the RAN by means of Radio Link Control, RLC, data blocks.

The mobile station is arranged to include the identity, ID, of its chosen PLMN in an RLC data block, and to inform the RAN of the presence of the ID of the chosen PLMN in the RLC data block by means of including a reserved or pre-defined value in the length indication field of the RLC data block.

In embodiments, the mobile station is arranged to include the ID of its chosen PLMN after the last Upper Layer PDU of the RLC data block.

In embodiments, the mobile station is arranged to use an LI value of 123 as the reserved or pre-defined value.

In embodiments, the mobile station is arranged to use different RAN modes and being arranged to use different reserved or pre-defined values to indicate the presence of the ID of a chosen PLMN depending on the RAN mode used.

In embodiments, the mobile station is arranged to use different reserved or pre-defined values for RAN modes GPRS and EGPRS.

The object stated above is also obtained by means of a Control Node which is arranged to be part of a Radio Access Network, a RAN, which is connected to a Core Network, CN, which comprises one or more Public Land Mobile Networks, PLMNs.

The Control Node is arranged to receive Radio Link Control, RLC, data blocks from a mobile station in a cell in the RAN, and the Control Node is arranged to inspect the Length Indicator field in said RLC data blocks, and to identify a reserved or pre-defined value which indicates that the RLC data block comprises the ID of one of said PLMNs which has been selected by the UE, and to find and extract said ID in the RLC Data block, and to forward the ID to a node in the RAN or in the CN.

In embodiments, the node to which the PLMN ID is forwarded by the Control Node is an SGSN.

In embodiments, the Control Node is arranged to find said PLMN ID after the last Upper Layer PDU of the RLC data block in which the PLMN ID is included.

In embodiments, the Control Node is arranged to identify an LI value of 123 as the reserved or pre-defined value.

In embodiments, the Control Node is arranged to handle more than one RAN mode, and being arranged to handle different reserved or pre-defined values which indicate the presence of the ID of a chosen PLMN, depending on RAN mode.

In embodiments, the Control Node is arranged to handle different reserved or pre-defined values which indicate the presence of the ID of a chosen PLMN for the RAN modes GPRS and EGPRS.

In embodiments, the Control Node is a GSM Base Station Controller, a BSC, arranged to be part of a Base Station System, BSS.

In embodiments, the Control Node is an LTE eNodeB.

In embodiments, the Control Node is a WCDMA RNC, Radio Network Controller.

As can be understood from the above, a principle of the invention is to let the mobile station include the selected, i.e. preferred, PLMN ID in an RLC data block, however without having to be included in the upper PDUs, i.e. LLC PDUs (Logical Link Control Physical Data Units), that contain the actual NAS message, as would be the case if e.g. the PLMN ID was included in a NAS message.

The inclusion of the PLMN ID in an RLC data block is, as shown above, achieved by re-using the length indication mechanism, which has hitherto been used mainly for letting the RLC receiving entity be able to correctly re-assemble the various segments of received upper layer PDUs, i.e. LLC PDUs. More specifically, the invention shows the use of a reserved or pre-defined value of the length indicator in an RLC data block in order to indicate the presence of a PLMN ID which identifies the mobile station's preferred PLMN in the RLC data block. The actual PLMN ID is then suitably but not necessarily, included as the four last octets of that RLC data block, suitably immediately following the length indicator.

BRIEF DESCRIPTION OF THE DRAWINGS

The invention will be described in more detail in the following, with reference to the appended drawings, in which.

DETAILED DESCRIPTION

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

Figure 1:
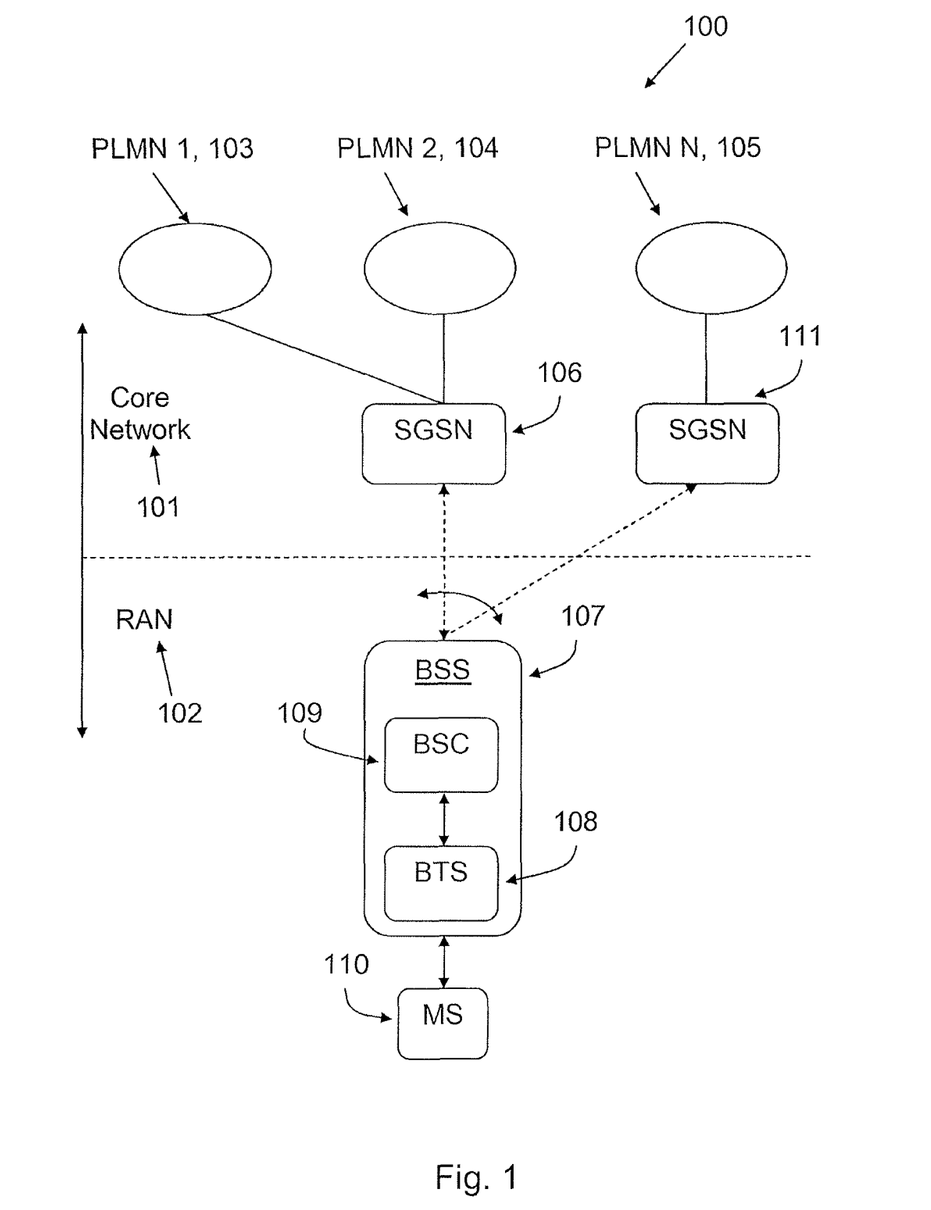
FIG. 1 shows a schematic view of a communications system.

FIG. 1 shows an overview of a communications system 100 which comprises a Core Network, CN, 101, and a Radio Access Network, RAN, 102. The Ran will in FIG. 1 and below be described with examples from GSM systems, so that the RAN comprises a Base Station Subsystem, BSS 107, which in turn comprises a Base Transceiver Station 108 and a Base Station Controller, BSS 109. The combination of a BTS and a BSC is used in GSM systems, and it should be pointed out that reference is made herein to this combination by way of example only; the invention can also be applied in other kinds of systems, e.g. LTE systems, in which case the function described herein of the BSC 109 is located in an eNodeB, and in a WCDMA system the function would be located in Radio Network Controller, an RNC. A generic term for these nodes as described herein is "a control node". However, the function of the control node will be described below and in the drawings with reference to a BSC as part of a BSS together with a BTS.

The CN 102 is a so called multi-operator core network, e.g. a so called FULL-MOCN network, i.e. the CN 102 comprises one or more Public Land Mobile Networks, PLMNs, and in the case of two or more PLMNs, the PLMNS are usually from two or more operators. This can also be seen as multiple PLMNs sharing one and the same RAN 102.

FIG. 1 shows a first 103 and a second 104 PLMN in FIG. 1, as well as an Nth PLMN 105, in order to indicate that there may be N PLMNs in the CN 102. In addition, two SGSNs 106 and 111 are shown in FIG. 1, where the SGSN 106 is shared by PLMNs 103 and 104, so called Gateway Core Network GWCN, while the SGSN 111 is exclusive for the PLMN 105. Both of these cases are possible.

As shown in FIG. 1, the CN 101 is connected to the RAN 102, and the RAN 102 may accommodate a number of mobile stations, MSs, one of which is shown as 110 in FIG. 1. The MS 110 is arranged to select one of the PLMNs in the CN 101 that share the RAN in 102, e.g. when the MS accesses the Packet Switched, PS, domain, e.g. when attaching to the CN 102 and/or the RAN 101. The fact that the MS 110 is arranged to select or "prefer" a PLMN in this way can, for example, be due to the fact that the MS 110 is arranged to support FULL-MOON systems, sometimes also referred to as "shared networks".

The ID of the MS's preferred PLMN is conveyed from the MS 110 to the RAN 102, and from there to the CN 102. In more detail, the MS 110 is arranged to communicate with the RAN 102 by means of so called RLC data blocks, and to include the ID of the preferred PLMN in an RLC data block, as well as to use the RLC data block to inform the RAN of the presence of the ID of the preferred PLMN in the RLC data block.

The RAN is informed by the MS 102 of the presence of the ID of the preferred PLMN in the RLC data block by means of the so called Length Indicator, LI, field in the RLC data block in that a reserved or pre-defined value of the LI field in the RLC data block indicates to the RAN that the RLC data block comprises the preferred PLMN ID, and the RAN is then arranged to find the preferred PLMN ID in the RLC data block, and to forward it to the CN 102, where the MS is connected to the preferred PLMN.

The presence of the ID of the preferred PLMN is thus conveyed by means of a reserved or pre-defined value in the LI field; the actual PLMN ID as such can be included in the RLC data block in various places, for example as the four last octets of the RLC data block in which the reserved or pre-defined value is included in the LI field. Another example of how to include the PLMN ID in the RLC data block would be to let the LI field be immediately followed by an octet that contains the so called PLMN Index field, as specified in 3GPP TS 44.060 v11.2.0 Rel-11. The PLMN ID selected by the MS can also be included after the last Packet Data Unit, PDU, in the RLC data block.

As mentioned, suitably, the MS 110 will include the PLMN ID and the indication of its presence in an RLC Data Block when accessing a Packet Switched, PS, domain in the RAN 102.

Also suitably, the MS 110 is arranged to handle more than one kind of RAN mode, and to use different reserved or pre-defined values to indicate the presence of the ID of a chosen PLMN for different RAN modes. For example, the MS 110 can be arranged to use different reserved or pre-defined values for GPRS and EGPRS systems, e.g. 62 for GPRS and 123 for EGPRS.

As can be understood, suitably the MS does not include the PLMN ID in every RLC data block it sends to the RAN;

suitably the PLMN ID is included by the MS when the MS has data to send with a foreign or a random TLLI, Temporary Logical Link Identifier, and the data that the MS then sends with a foreign or random TLLI is suitably a registration message, e.g. ATTACH or ROUTING AREA UPDATE REQUEST.

Figure 2:
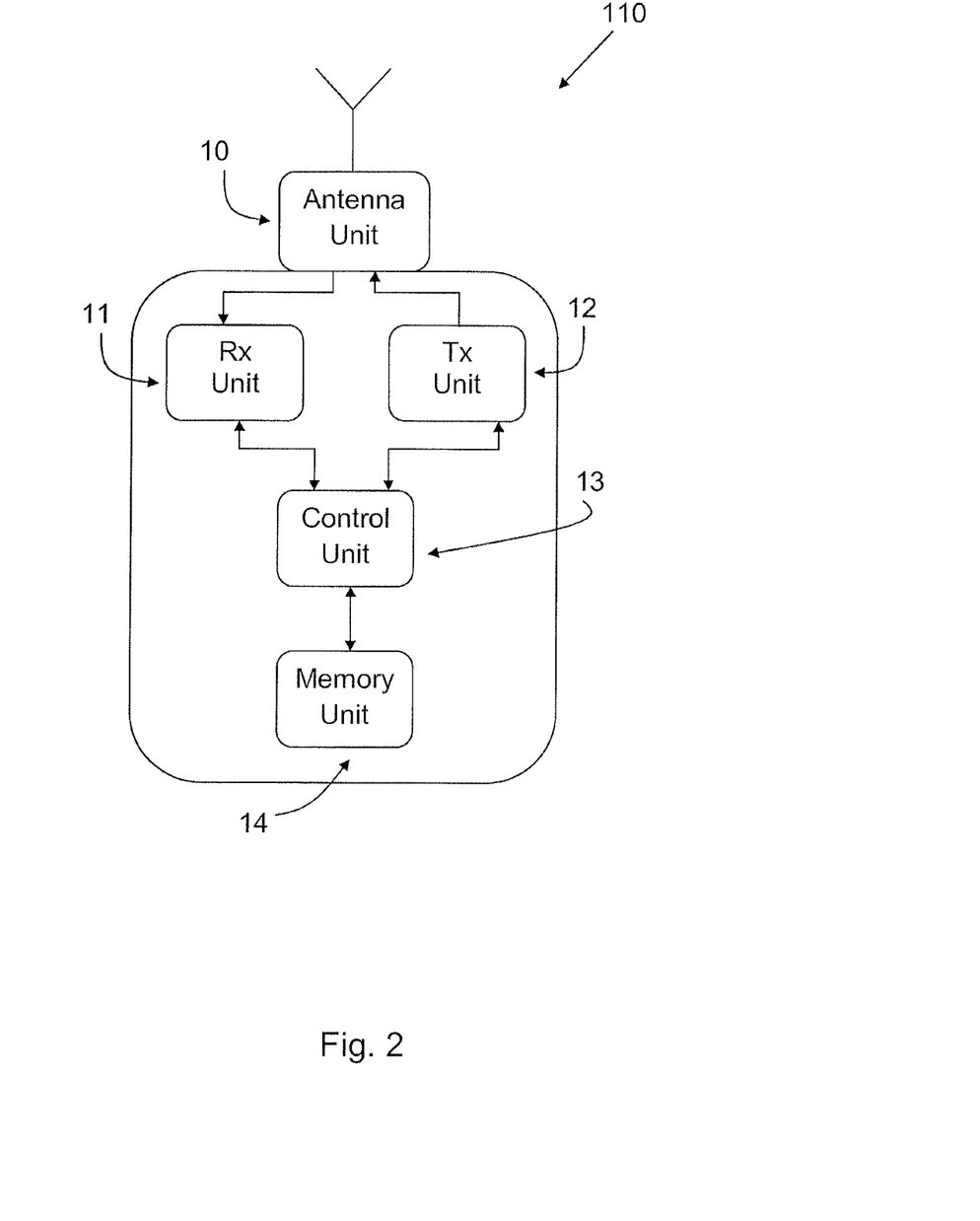
FIG. 2 shows a block diagram of a User Equipment.

FIG. 2 shows a schematic block diagram of the MS 110: as can be seen, the MS 110 comprises an antenna unit 10, which is used as both a transmit and receive antenna. In addition, the MS 110 comprises a receive unit Rx 11, and a transmit unit, Tx 12. The function of the MS 110 in general, as well as the function of the receive and transmit units is controlled by a control unit 13. In addition, the MS 110 also comprises a memory unit 14, which can be used both to store information and to store executable code which is used when operating the MS 110. The information which is stored in the memory unit 14 can, for example, be the ID of the PLMN or PLMNs which the MS 110 should choose and indicate as its preferred PLMN in a FULL-MOON system. The reserved or predefined value or values of the LI field which indicate the presence of a PLMN ID in an RLC data block is/are also preferably stored in the memory unit 14.

The ID of the MS's preferred PLMN is placed in an RLC data block by the control unit, which is also the case of the pre-defined or reserved value which indicates the presence of the PLMN ID in the RLC data block. The RLC data block is then transmitted by the transmit unit 12, through the antenna unit 10, as controlled by the control unit 13.

It is also the control unit 13 which enables the MS 110 to use different RAN Modes, such as GPRS and EGPRS.

Thus, the MS 110 transmits its choice of PLMN ID to the RAN 102, where it is extracted from the RLC Data block and forwarded to the CN 101. In more detail, the MS 110 transmits its RLC data blocks to the control node of its cell; in the example shown in FIG. 1 with the control node as such being part of a so called BSS, Base Station System, shown in FIG. 1 as 107. The BSS 107 comprises a Base Transceiver Station, BTS 108, and a Base Station Controller 109. Suitably, it is the BSC 109 which uses the predefined or reserved LI field indicator value to recognize that an RLC data block comprises a PLMN ID, and "extracts" the PLMN ID from the RLC data block.

Thus, the BSC 109 "inspects" the LI field in the RLC data blocks, and if it identifies a reserved or pre-defined value which indicates that the RLC data block comprises the ID of a PLMN, the BSC 109 then finds and extract the PLMN ID in the RLC Data block, and forwards the PLMN ID to another node in the RAN 102 or in the CN 101. Suitably, this other node is a so called SGSN 106, 111, as shown in FIG. 1, which is in the CN 101.

Since the BSC 109 is the node in the RAN that finds and extracts the PLMN ID, the BSC 109 is arranged to look for the PLMN ID in places in the RLC data blocks corresponding to those places in which the MS 110 is arranged to place the PLMN ID, as described earlier in this text. Thus, in embodiments, the BSC 109 is arranged to find the PLMN ID as the four last octets of the RLC Data block in which the reserved or pre-defined value is included in the LI field, as an alternative or complement to which the BSC 109 is arranged to find the PLMN ID immediately after the LI field, by means of an octet that contains the so called PLMN Index field, as specified in 3GPP TS 44.060 v11.2.0 Rel-11. Alternatively or as a complement, the BSC 109 is also arranged to find the PLMN ID selected by the MS after the last Packet Data Unit, PDU, in the RLC data block in which the reserved or predefined value is found.

Suitably, the BSC 109 is arranged to handle more than one kind of RAN mode, and is then arranged to handle different reserved or pre-defined values which indicate the presence of the ID of a chosen PLMN, depending on different RAN systems. For example, the BSC 109 can in embodiments be arranged to handle different reserved or pre-defined values which indicate the presence of the ID of a chosen PLMN for GPRS and EGPRS systems, e.g. the value of 62 for GPRS and 123 for EGPRS.

Figure 3:
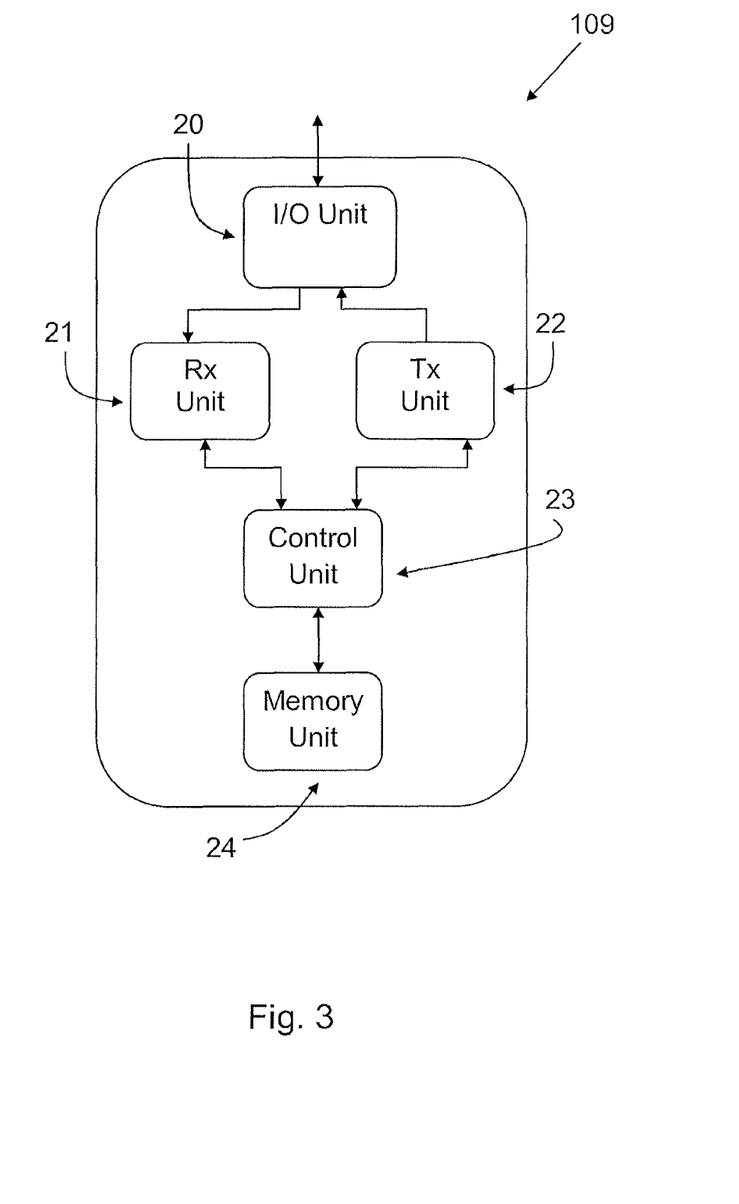
FIG. 3 shows a block diagram of a Base Station Controller.

FIG. 3 shows a schematic block diagram of the BSC 109: as can be seen, on this level of abstraction, there are similarities between the MS 110 and the BSC 109. As shown in FIG. 3, the BSC 109 comprises an I/O unit 20 for communication with other nodes in the system 100, e.g. the BTS 108 and nodes in the CN 101, suitably one or more SGSN, such as the SGSNs 106 and 111 shown in FIG. 1. The I/O unit can comprise antenna units, for wireless communication, but will also usually comprise possibilities for "landline" connections with the BTS 108 and the CN 101, e.g. the SGSN(s) 106, 111, in the CN.

In addition to the I/O-unit 20, the BSC 109 also comprises a receive unit Rx 21, and a transmit unit, Tx 22. The function of the BSC 109 in general, as well as the function of the receive and transmit units is controlled by a control unit 23. In addition, the BSC 109 also comprises a memory unit 24, which can be used both to store information and to store executable code which is used during operation of the BSC 109. The information which is stored in the memory unit 24 can, for example, be the reserved or predefined value or values of the LI field which indicate the presence of a PLMN ID in an RLC data block.

In addition, information regarding where in an RLC data block to find the PLMN ID if the LI field in the RLC data block is the reserved or predefined value which indicates the presence of a PLMN ID is also suitably stored in the memory unit 24.

Figure 4:
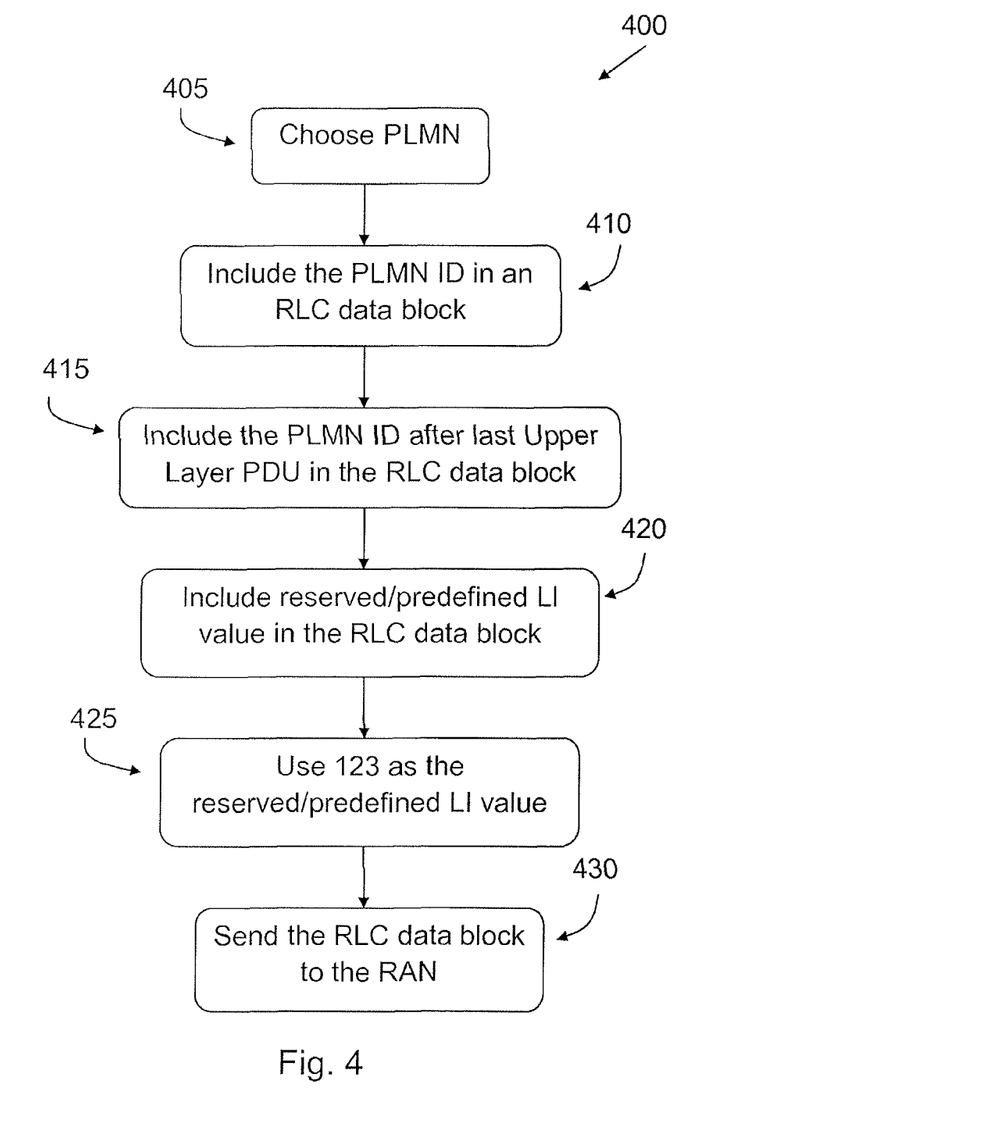
FIG. 4 shows a flow chart of a method for use in a User Equipment.

FIG. 4 shows a schematic flow chart of a method 400 for operating a mobile station in a Radio Access Network, a RAN, where the RAN is connected to a core network in which there is one or more Public Land Mobile Networks, PLMNs.

As shown in step 405, the method comprises having the Mobile Station choose one of said PLMNs when accessing a Packet Switched, PS, domain in the RAN (e.g. when attaching to the RAN 102 or a Core Network, CN, to which the RAN is connected), and as indicated in step 410, the method 400 comprises including the identity, the ID, of the chosen PLMN in an RLC data block.

Step 420 shows that the method 400 comprises including a reserved or pre-defined value in the length indication field of the RLC data block as information to the RAN of the presence of the ID of the chosen PLMN in the RLC data block, and step 430 shows that the method comprises sending said RLC data block to the RAN In embodiments, the method comprises, as shown in step 415, including the ID of the chosen PLMN after the last Upper Layer PDU of the RLC data block.

In embodiments, the method comprises, as shown in step 425, the use of an LI value of 123 as the reserved or pre-defined value.

In embodiments, the method comprises, arranging the mobile station to use different RAN modes and to use different reserved or pre-defined values to indicate the presence of the ID of a chosen PLMN depending on the RAN mode used.

Figure 5:
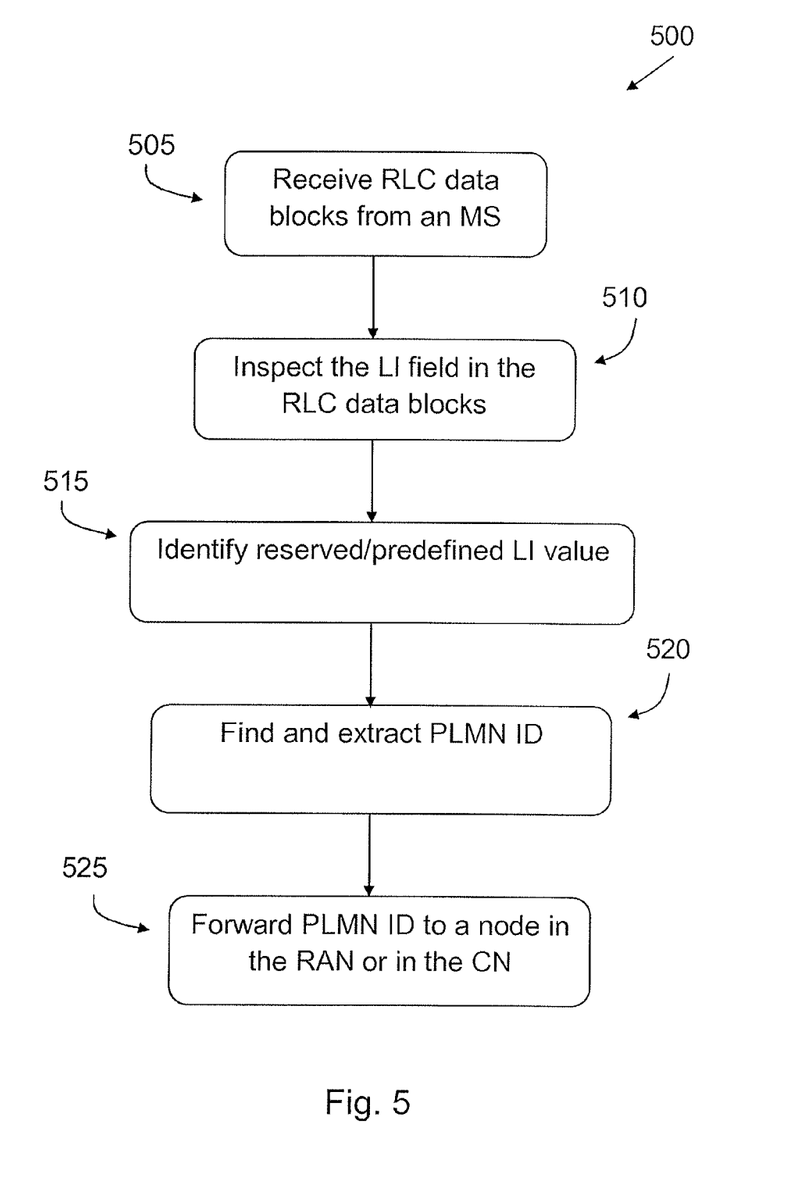
FIG. 5 shows a flow chart of a method for use in a User Equipment.

FIG. 5 shows a schematic flow chart of a method 500 for operating a Control Node, e.g. Base Station Controller, a BSC, in a Base Station System, a BSS. Other examples of such control nodes include an LTE eNodeB and a WCDMA RNC, Radio Network Controller.

The control node is arranged to be part of a Radio Access Network, a RAN, which is connected to a Core Network, a CN, which comprises one or more Public Land Mobile Networks, PLMNs.

As shown in step 505, the method 500 comprises receiving Radio Link Control, RLC, data blocks from a mobile station in a cell in the RAN, and also comprises, as shown in step 510, inspecting the Length Indicator field in said RLC data blocks, and, step 515, identifying a reserved or pre-defined value which indicates that the RLC data block comprises the ID of one of said PLMNs which has been selected by the UE.

As shown in step 520, the method 500 comprises finding and extracting said ID in the RLC Data block, and, step 525, forwarding the ID to a node in the RAN or in the CN.

According to embodiments of the method 500, the node to which the PLMN ID is forwarded to is an SGSN.

According to embodiments of the method 500, the PLMN ID is found after the last Upper Layer PDU of the RLC data block in which the PLMN ID is included.

In embodiments, the method 500 comprises handling more than one RAN mode, and handling different reserved or pre-defined values which indicate the presence of the ID of a chosen PLMN, depending on RAN mode.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A mobile station for use in a Radio Access Network (RAN), the RAN being connected to a core network in which there is one or more Public Land Mobile Networks (PLMNs), the mobile station comprising:
   an interface to communicate with the RAN using Radio Link Control (RLC) data blocks;
   a processor to:
   select one of said PLMNs when accessing a Packet Switched (PS) domain in the RAN;
   generate an RLC data block, the RLC data block comprising:
   an ID of the selected one of the PLMNs; and
   inform the RAN by including a reserved or pre-defined value in a length indicator field of the RLC data block, the reserved or pre-defined value indicating the presence of the ID of the selected one of the PLMNs, the ID of the selected one of the PLMNs placed in a field following the length indicator field of the RLC data block,
   wherein the processor is operable to use a length indicator value of 123 or 62 as the reserved or pre-defined value.

2. The mobile station of claim 1, wherein the processor is operable to use different RAN modes and being arranged to use different reserved or pre-defined values to indicate the presence of the ID of the selected one of the PLMNs depending on the RAN mode used.

3. The mobile station of claim 2, wherein the processor is operable to use different reserved or pre-defined values for RAN modes GPRS and EGPRS.

4. A Control Node arranged to be part of a Radio Access Network (RAN), which is connected to a Core Network (CN) which comprises one or more Public Land Mobile Networks (PLMNs), the Control Node comprising:
   an interface to communicate with the RAN using Radio Link Control (RLC) data blocks;
   a processor to:
   receive a Radio Link Control (RLC) data block from a mobile station in a cell in the RAN, the RLC data block comprising:
   an ID of a particular one of the PLMNs that has been selected by the mobile station; and
   a reserved or pre-defined value in a length indicator field of the RLC data block;
   inspect the length indicator field in the RLC data block;
   determine that the reserved or pre-defined value indicates that the RLC data block includes the ID of the particular one of the PLMNs selected by the mobile station in a field of the RLC data block following the Length Indicator field; and
   forward the ID of the particular one of the PLMNs to a node in the RAN or in the CN, and
   wherein the processor is operable to use a length indicator value of 123 or 62 as the reserved or pre-defined value.

5. The Control Node of claim 4, in which said node to which the ID of the particular one of the PLMNs is forwarded to is an SGSN.

6. The Control Node of claim 4, wherein the processor is operable to handle more than one RAN mode, and being arranged to handle different reserved or pre-defined values which indicate the presence of the ID of the particular one of the PLMNs, depending on an associated RAN mode.

7. The Control Node of claim 6, wherein the processor is operable to handle different reserved or pre-defined values which indicate the presence of a the ID of the particular one of the PLMNs for the RAN modes GPRS and EGPRS.

8. A method for operating a Mobile Station in a Radio Access Network (RAN) which is connected to a core network in which there is one or more Public Land Mobile Networks (PLMNs), the method comprising:
  selecting one of said PLMNs when accessing a Packet Switched (PS) domain in the RAN; and
  generating a Radio Link Control data block, the RLC data block comprising:
    one of the PLMNs; and
    a reserved or pre-defined value in a length indicator field of the RLC data block, the reserved or pre-defined value indicating the ID of the selected one of the PLMNs in a field following the length indicator field of the RLC data block, wherein a length indicator value of 123 or 62 is used as the reserved or pre-defined value; and
  sending said RLC data block to the RAN.

9. The method of claim 8, comprising arranging the mobile station to use different RAN modes and to use different reserved or pre-defined values to indicate the presence of the ID of the selected one of the PLMNs, depending on the RAN mode used.

10. The method of claim 9, comprising the use of different reserved or pre-defined values for RAN modes GPRS and EGPRS.

11. A method for operating a Control Node which is arranged to be part of a Radio Access Network (RAN), which is connected to a Core Network (CN), which comprises one or more Public Land Mobile Networks (PLMNs), the method comprising:
  receiving a Radio Link Control (RLC) data block from a mobile station in a cell in the RAN, the RLC data block comprising:
    an ID of a particular one of the PLMNs that has been selected by the mobile station; and
    a reserved or pre-defined value in a length indicator field of the RLC data block, wherein a length indicator value of 123 or 62 is used as the reserved or pre-defined value;
  inspecting the length indicator field in the RLC data block;
  determining that the reserved or pre-defined value indicates that the RLC data block includes the ID of the particular one of the PLMNs selected by the mobile station in a field of the RLC data block following the length indicator field; and
  forwarding the ID of the particular one of the PLMNs to a node in the RAN or in the CN.

12. The method of claim 11, according to which said node to which the ID of the selected one of the PLMNs is forwarded to is a SGSN an SGSN.

13. The method of claim 11, comprising handling more than one RAN mode, and handling different reserved or pre-defined values which indicate the presence of an ID of the selected PLMN, depending on an associated RAN mode.

* * * * *

UNITED STATES PATENT AND TRADEMARK OFFICE
CERTIFICATE OF CORRECTION

PATENT NO. : 9,532,206 B2
APPLICATION NO. : 14/963877
DATED : December 27, 2016
INVENTOR(S) : Bergstrom et al.

It is certified that error appears in the above-identified patent and that said Letters Patent is hereby corrected as shown below:

On the Title Page

In Item (56), under "U.S. PATENT DOCUMENTS", in Column 2, Line 1, delete "Bergstrom......H04W 48/18" and insert -- Bergstrom et al. ......H04W 48/18 1/1 --, therefor.

In Item (56), under "U.S. PATENT DOCUMENTS", in Column 2, Line 2, delete "Bergstrom......H04W 48/18" and insert -- Bergstrom et al. ......H04W 48/18 1/1 --, therefor.

In Item (56), under "OTHER PUBLICATIONS", in Column 2, Line 4, delete "1-29, Jun. 2011." and insert -- 1-29. --, therefor.

In Item (57), under "ABSTRACT", in Column 2, Line 2, delete "RAN" and insert -- RAN, --, therefor.

In Item (57), under "ABSTRACT", in Column 2, Line 3, delete "PLMNs" and insert -- PLMNs, --, therefor.

On Page 2, in Item (56), under "OTHER PUBLICATIONS", in Column 1, Line 2, delete "pp. 1-1O, 2001." and insert -- pp. 1-10. --, therefor.

On Page 2, in Item (56), under "OTHER PUBLICATIONS", in Column 1, Line 7, delete "Control I Medium" and insert -- Control/Medium --, therefor.

On Page 2, in Item (56), under "OTHER PUBLICATIONS", in Column 2, Line 5, delete "Control I Medium" and insert -- Control/Medium --, therefor.

On Page 2, in Item (56), under "OTHER PUBLICATIONS", in Column 2, Line 10, delete "Control I Medium" and insert -- Control/Medium --, therefor.

On Page 2, in Item (56), under "OTHER PUBLICATIONS", in Column 2, Line 24,

Signed and Sealed this
Ninth Day of May, 2017

Michelle K. Lee
*Director of the United States Patent and Trademark Office* delete ""3ra" and insert -- "3rd --, therefor.

In the Specification

In Column 1, Line 29, delete "FULL-MOON," and insert -- FULL-MOCN, --, therefor.

In Column 1, Line 31, delete "FULL-MOON" and insert -- FULL-MOCN --, therefor.

In Column 1, Line 40, delete "FULL-MOON" and insert -- FULL-MOCN --, therefor.

In Column 3, Line 6, delete "if" and insert -- if, --, therefor.

In Column 3, Line 29, delete "system, and" and insert -- system, --, therefor.

In Column 3, Line 30, delete "Equipment, and" and insert -- Equipment, --, therefor.

In Column 3, Lines 31-32, delete "Controller, and" and insert -- Controller, --, therefor.

In Column 3, Line 54, delete "BSS" and insert -- BSS, --, therefor.

In Column 3, Line 55, delete "Station 108" and insert -- Station, BTS, 108 --, therefor.

In Column 3, Line 56, delete "BSS 109." and insert -- BSC, 109. --, therefor.

In Column 4, Line 1, delete "CN 102" and insert -- CN 101 --, therefor.

In Column 4, Line 2, delete "CN 102" and insert -- CN 101 --, therefor.

In Column 4, Line 10, delete "CN 102." and insert -- CN 101. --, therefor.

In Column 4, Line 13, delete "Network GWCN," and insert -- Network, GWCN, --, therefor.

In Column 4, Line 21, delete "CN 102 and/or the RAN 101." and insert -- CN 101 and/or the RAN 102. --, therefor.

In Column 4, Line 24, delete "FULL-MOON" and insert -- FULL-MOCN --, therefor.

In Column 4, Line 27, delete "CN 102." and insert -- CN 101. --, therefor.

In Column 4, Line 34, delete "MS 102" and insert -- MS 110 --, therefor.

In Column 4, Line 41, delete "CN 102," and insert -- CN 101, --, therefor.

In Column 4, Line 46, delete "for example" and insert -- for example, --, therefor.
In Column 5, Line 10, delete "unit Rx" and insert -- unit, Rx, --, therefor.

CERTIFICATE OF CORRECTION (continued)

In Column 5, Line 11, delete "unit, Tx" and insert -- unit, Tx, --, therefor.

In Column 5, Line 20, delete "FULL-MOON" and insert -- FULL-MOCN --, therefor.

In Column 6, Line 21, delete "I/O-unit" and insert -- I/O unit --, therefor.

In Column 6, Line 22, delete "unit Rx 21, and a transmit unit, Tx" and insert -- unit, Rx, 21, and a transmit unit, Tx, --, therefor.

In Column 6, Line 54, delete "RAN" and insert -- RAN. --, therefor.

In the Claims

In Column 8, Lines 56-57, in Claim 4, delete "Length Indicator" and insert -- length indicator --, therefor.

In Column 9, Line 6, in Claim 7, delete "a the" and insert -- the --, therefor.

In Column 9, Line 9, in Claim 8, delete "(RAN)" and insert -- (RAN), --, therefor.

In Column 10, Line 26, in Claim 12, delete "a SGSN an SGSN." and insert -- an SGSN. --, therefor.